C. G. HAMILTON.
DIRECTION INDICATOR FOR VEHICLES.
APPLICATION FILED MAY 10, 1915.
1,217,759.
Patented Feb. 27, 1917.
2 SHEETS—SHEET 1.
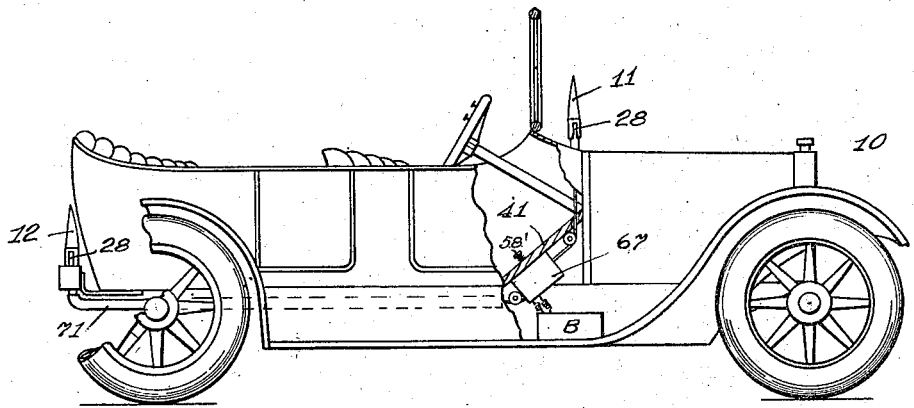
Fig. 1
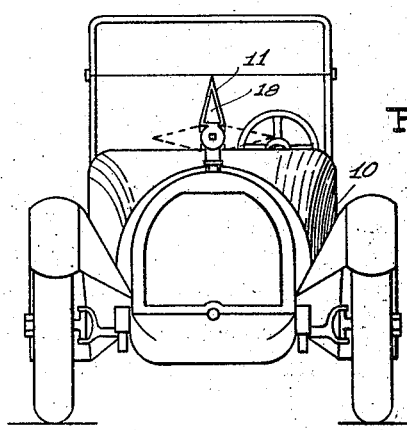
Fig. 2
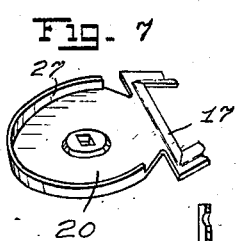
Fig. 7
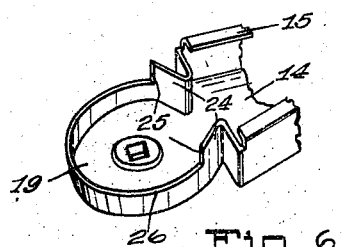
Fig. 6
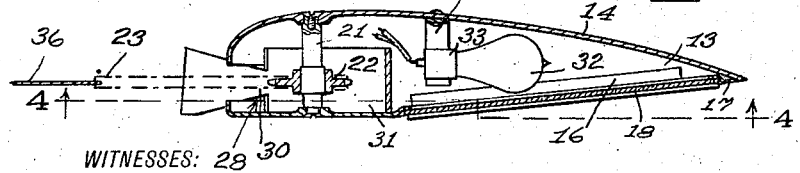
Fig. 4
Fig. 3
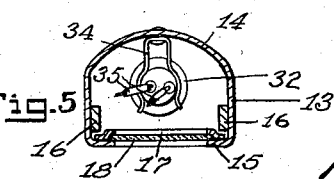
Fig. 5
WITNESSES:
E. Peterson
F. C. Matheny
INVENTOR
Cameron G. Hamilton
BY
Pierre Barnes
ATTORNEY

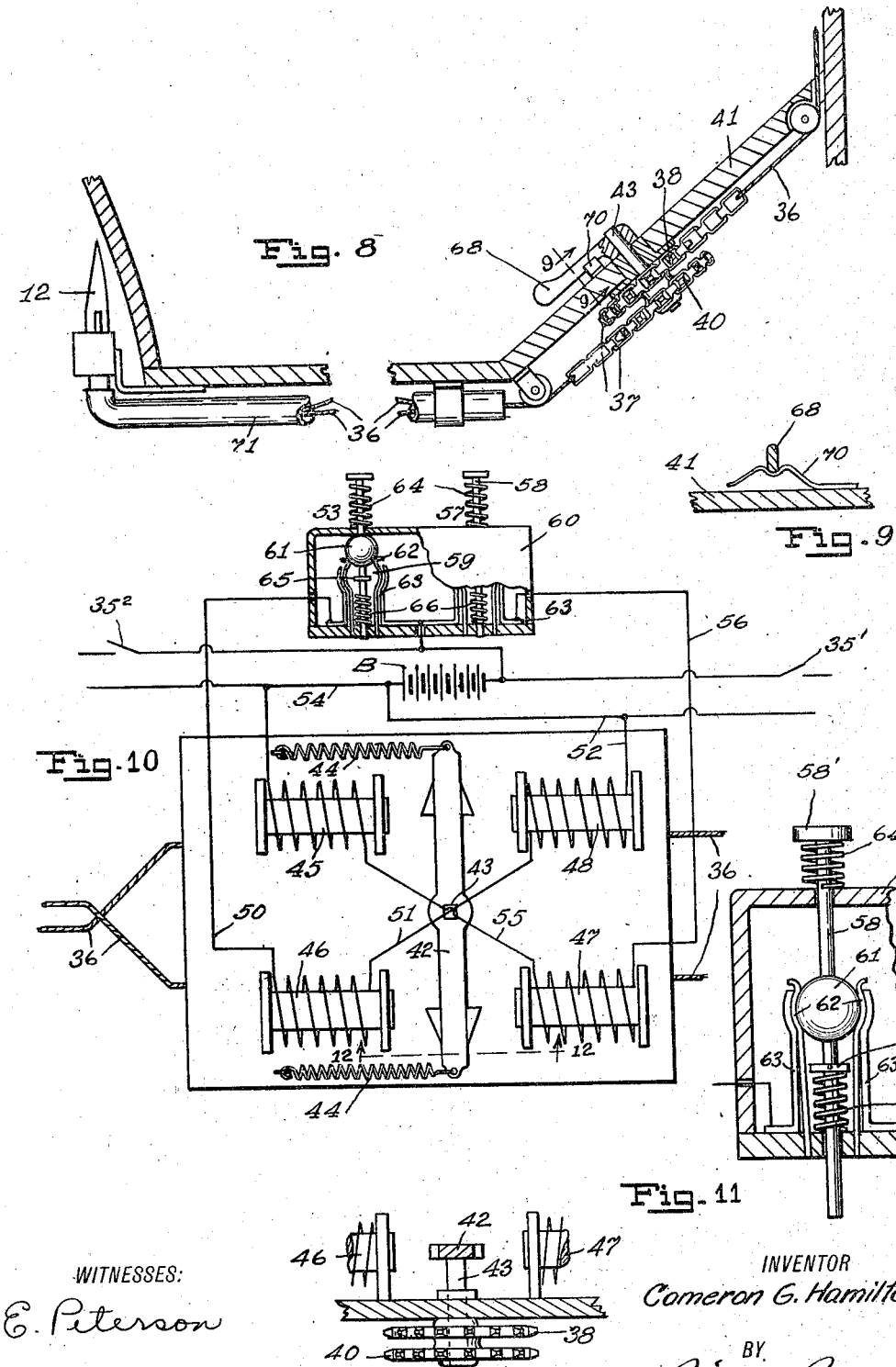

UNITED STATES PATENT OFFICE.

CAMERON G. HAMILTON, OF SEATTLE, WASHINGTON, ASSIGNOR OF ONE-HALF TO CULLEN K. STURTEVANT, OF SEATTLE, WASHINGTON.

DIRECTION-INDICATOR FOR VEHICLES.

1,217,759. Specification of Letters Patent. Patented Feb. 27, 1917.

Application filed May 10, 1915. Serial No. 27,108.

*To all whom it may concern:*

Be it known that I, CAMERON G. HAMILTON, a citizen of the United States, residing at Seattle, in the county of King and State of Washington, have invented certain new and useful Improvements in Direction-Indicators for Vehicles, of which the following is a specification.

This invention relates to improvements in direction indicators for vehicles as automobiles and the object of the improvement is to provide a conspicuous indicator for vehicles, especially automobiles, of strong and simple construction that may be operated either electrically or mechanically to indicate the direction in which an automobile is going to proceed as a warning and safeguard to other vehicles and pedestrians.

The invention consists in the novel construction, adaptation and combination of parts of a direction indicator, as will be more clearly described in the following specification, illustrated in the accompanying drawings, and finally pointed out in the appended claims.

In the drawings, Figure 1 is a view in side elevation of an automobile to which my invention has been applied, certain parts being broken away to illustrate the position of the direction indicating mechanism; Fig. 2 is a view in front elevation of the same; Fig. 3 is an enlarged view in longitudinal cross section of the direction indicating arrow. Fig. 4 is a view partly in elevation and partly in cross-section on broken line 4—4 of Fig. 3; Fig. 5 is a view in cross section on broken line 5—5 of Fig. 4; Figs. 6 and 7 are fragmentary views in perspective of details of the invention; Fig. 8 is a fragmentary sectional view illustrating a mechanical device for actuating the direction indicating arrow; Fig. 9 is a fragmentary view in cross-section on broken line 9—9 of Fig. 8; Fig. 10 is a somewhat diagrammatic view of an electrically controlled actuating device; Fig. 11 is an enlarged view partly in vertical section and partly in elevation of a switch mechanism and Fig. 12 is a view in cross section on broken line 12—12 of Fig. 10.

Referring to the drawings, throughout which like reference numerals indicate like parts, the numeral 10 indicates an automobile upon which I have shown my device to be installed, and 11 and 12 are front and rear signal arrows, respectively, that are secured to the front and the rear parts of the automobile in conspicuous locations; such arrows are or may be identical in their form of construction.

The arrows 11 and 12 are desirably each composed of an outer shell or casing 13 having a rounded back portion 14 and inturned top edges 15 and interiorly disposed longitudinally extending side plates 16 that form channels within which the edge of a top plate 17 is adapted to slide, as more clearly shown in Fig. 5.

The top plate 17 is provided with an inlaid glass plate 18 which may be of red glass to take the place of the usual tail-light in the rear signal and both the top plate 17 and the casing 13 are provided with integrally constructed cylindrical base portions 19 and 20, respectively, as more clearly shown in Figs. 6 and 7, through which extends a fixedly secured transverse shaft 21 that carries a sprocket wheel 22 operated by a chain 23 that is connected with suitable actuating mechanism hereinafter explained.

The base portion 19 is formed with a flange 24 that is cut away to provide shoulders 25 and an annular rim 26, as more clearly shown in Fig. 6, and the base portion 20 is formed with a flange or rim 27 that is spaced from the rim 26 when the arrow is assembled to provide a slot 28 within which the narrowed portions 30 of a supporting bracket 31 are adapted to move when the arrow is turned, the bracket 31 fitting within the flanges 26 and 27 and serving as a bearing upon which the arrows are turned.

An electric lamp 32 provided with a socket 33 is supported within the casing 13 by a bracket 34 and is connected by electric circuit wires 35 with a suitable source of electrical current, as with a battery B, whereby the arrow may be illuminated at night.

The chains 23 are preferably connected with cables 36 that connect with other chains 37 that pass around sprocket wheels 38 and 40 preferably located below the foot board 41 of the car 10.

In Fig. 10 I have illustrated an electrically controlled mechanism for operating my direction indicator consisting in an armature 42 mounted on a shaft 43 that is rigidly connected with the sprocket wheels 38 and 40 and is yieldingly supported by springs 44 in a medial position between four electromagnets 45, 46, 47 and 48.

The electro-magnets 46 and 48 are connected in circuit with the battery B by electric circuit wires 50, 51 and 52 within which circuit is interposed a push button switch 53, and the electromagnets 45 and 47 are similarly connected in circuit with the battery B by electric circuit wires 54, 55 and 56 within which latter circuit is interposed a push button switch 57 similar to the switch 53.

The switches 53 and 57 each consist in a push bar 58, disposed in a casing 60 and provided with a fixedly secured ball 61 that is adapted, when the bar 58 is pushed downwardly, to expand opposed curved spring members 62 and make electrical connection with contact members 63, as more clearly shown in Fig. 11, thus closing the circuit formed by the circuit wires 50, 51 and 52, energizing the electromagnets 46 and 48 and causing the armature 42 to be deflected into engagement with said electromagnets.

The sprocket wheels 38 and 40 are thus turned, which act through the chains 23, 36 and 37 to turn the arrows 11 and 12 to the right to indicate the direction that the car 10 is to be turned.

The switch bar 58 is provided above the casing 60 with a compression spring 64 and is further provided below the ball 61 with a collar 65 that is adapted to engage with and compress another spring 66 when the bar 58 is depressed, as shown in Fig. 11, to cause the ball 61 to rest within a suitably formed recess 59 between the springs 62.

When the bar 58 and associated parts are in this position, the spring 64 will be partially compressed and the collar 65 will be in engagement with the top end of the spring 66, but the upward pressure will not be sufficient to force the ball 61 upwardly out of the recess 59. If, however, the bar 58 is further depressed and then quickly released, the compression in the springs 64 and 66 will be sufficient to impart an upward throw to the bar 58 and force the ball upwardly out of the recess 59. Thus, the switch may be closed by depressing the bar 58 partially, and will remain closed until such bar is further depressed and then quickly released.

The switch 57 is of the same form of construction as the switch 53 and may be operated in the same manner to energize the electro-magnets 45 and 47 and turn the arrows 11 and 12 to the left.

The actuating apparatus illustrated in Fig. 10 is preferably inclosed in a box 67 that may be secured beneath the foot-board of the car 10, as shown in Fig. 1, and the switch box 60 is so located that the bars 58, upon the top ends of which are buttons 58¹, project upwardly from the foot-board where they are easily accessible to the foot of the driver of the car.

The cables 36 that extend to the rear signal 12 are necessarily crossed, as in Fig. 10, to cause the arrows 11 and 12 to be turned in the same direction in response to a slight turning movement of the wheels 38 and 40.

In Fig. 8 I have illustrated a mechanically operated device for turning the arrows 11 and 12, which device consists in extending the shaft 43 upwardly through the foot-board 41 and providing a foot lever 68 on the top end thereof that is adapted to be turned sidewise by pressure of the foot to turn the wheels 38 and 40. The lever 68 is yieldingly held in place by a peculiarly shaped spring-plate 70, more clearly shown in Fig. 9.

The cables 36 may be conducted to the arrows 11 and 12 through conduits 71 of any desired form such conduits being preferably flexible in order that they may be easily adapted to the configuration of different types of automobiles.

The operation of the invention is as follows:

The device is installed on an automobile, as shown in Figs. 1 and 2, and the arrows are normally adapted to point in a vertical direction. When the driver desires to turn to the right he presses the switch 53, thus turning the shaft 43 in a clockwise direction and turning the arrows 11 and 12 both to the right. After he has completed the turn he again presses the button of the switch 53 and releases it quickly, thus breaking the connection formed by such switch and permitting the springs 44 to turn the armature 42 back into the medial position, and by so doing turn the arrows 11 and 12 back into a vertical position.

The signal for a turn to the left is accomplished in a similar manner by pressing the button of the switch 57.

The circuits formed by the wires 35 that are connected with the lamps 32 in the front and rear signal arrows 11 and 12, respectively, are preferably provided with independent switches 35¹ and 35² respectively, as illustrated in Fig. 10, whereby such lamps may be lighted or extinguished at the will of the driver.

I have described my invention as illustrated in considerable detail, but I do not intend to confine myself to such illustrated embodiment of the invention as, obviously, various modifications of parts and changes in arrangement may be resorted to within the scope of the claims without departing from the spirit of the invention.

What I claim, is—

1. A direction indicator for motor vehicles comprising a pointer formed of a hollow casing, a circular base portion on said casing, said base portion having a slot, a bracket having an enlarged circular portion that fits within said circular base, said bracket being provided with standards having narrowed portions that project outwardly through said slot in said circular base, a sprocket wheel secured to said pointer, another sprocket wheel journaled on said motor vehicle, a chain connecting said two sprocket wheels, and mechanism operable from the driver's seat for turning said last named sprocket wheel to actuate said pointer.

2. A direction indicator for motor vehicles, comprising a pointer formed of a hollow casing, a bracket articulating said pointer with a motor vehicle, a sprocket wheel secured within said pointer, another sprocket wheel associated with said motor vehicle, a chain connecting said two sprocket wheels, electrically operated mechanism for turning said last named sprocket wheel, and a switch operable from the driver's seat for controlling said electrically operated mechanism.

3. A direction indicator for vehicles, comprising a hollow casing having a transparent portion and a circular base formed with a slot in its circumferential wall, a bracket received within the casing-base to support said casing for swinging movements in a vertical plane transverse to the longitudinal axis of the vehicle, said bracket having standards secured to the vehicle and protruded through said slot, a lamp provided within said casing, and electric circuit wires connected with said lamp to make the same incandescent and extending through said slot between said standards.

4. A direction indicator for vehicles, consisting in a pointer having a base of circular configuration, a bracket having a support for said pointer of corresponding configuration and spaced standards secured to the vehicle, said base being mounted exteriorly of said bracket and formed with a slot through which said standards are protruded.

5. A direction indicator for vehicles, consisting in a pointer having a portion of its casing formed of translucent material, said pointer having a base of circular configuration, a bracket having a support for said pointer of corresponding configuration to said base, and spaced standards secured to the vehicle, said base being mounted exteriorly of said bracket and formed with a slot through which said standards are protruded, a lamp positioned in said pointer, and electric circuit wires connected with said lamp and entering said pointer through said slot whereby they are concealed by said bracket.

6. A direction indicator for vehicles, comprising a pointer having a base of circular configuration and provided with inwardly directed flanges arranged to leave a slotted opening in said base, a bracket having an enlarged circular portion that fits within said circular base and is adapted to bear against the side faces of said casing, said bracket being provided with standards having narrowed portions and projecting outwardly through the slot in said rounded base portion, and means for oscillating said pointer on said bracket.

Signed at Seattle, Washington, this 26th day of April, 1915.

CAMERON G. HAMILTON.

Witnesses:
 HORACE BARNES,
 PIERRE BARNES.

Copies of this patent may be obtained for five cents each, by addressing the "Commissioner of Patents. Washington, D. C."